US012709246B2

(12) United States Patent
Robertson et al.

(10) Patent No.: US 12,709,246 B2
(45) Date of Patent: Aug. 18, 2026

(54) DUAL OUTLET FLUID SPRAY NOZZLES FOR MOTOR VEHICLES

(71) Applicant: FORD GLOBAL TECHNOLOGIES, LLC, Dearborn, MI (US)

(72) Inventors: Michael Robertson, West Bloomfield, MI (US); Venkatesh Krishnan, Canton, MI (US); John A. Shinska, Dearborn, MI (US); Martin D. Lopez, Oakland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 354 days.

(21) Appl. No.: 18/329,985

(22) Filed: Jun. 6, 2023

(65) Prior Publication Data

US 2024/0409064 A1 Dec. 12, 2024

(51) Int. Cl.

*B60S 1/52* (2006.01)
*H04N 23/51* (2023.01)
*H04N 23/52* (2023.01)
*H04N 23/56* (2023.01)

(52) U.S. Cl.

CPC ................ *B60S 1/52* (2013.01); *H04N 23/51* (2023.01); *H04N 23/52* (2023.01); *H04N 23/56* (2023.01)

(58) Field of Classification Search

None

See application file for complete search history.

(56) References Cited

U.S. PATENT DOCUMENTS 6,196,617 B1 * 3/2001 Beck ........................ B60J 5/105 16/334
6,478,368 B1 * 11/2002 de Gaillard ............ B60J 7/1642 296/216.02
6,805,393 B1 * 10/2004 Stevenson ................ B60J 5/105 296/50
8,671,504 B2 3/2014 Ono et al.
9,327,689 B2 5/2016 Kikuta et al.
10,011,251 B2 7/2018 Gokan et al.
10,525,937 B2 1/2020 Zhao et al.
2002/0005650 A1 * 1/2002 Rogers, Jr. .............. E05F 15/63 296/56
2004/0124659 A1 * 7/2004 Vaitus .................. B60Q 1/2615 296/106
2006/0279108 A1 * 12/2006 Brockhoff ................ B60J 5/105 296/202
2012/0117745 A1 5/2012 Hattori et al.
2012/0326466 A1 * 12/2012 Kileen ..................... B60J 5/101 296/50

(Continued)

FOREIGN PATENT DOCUMENTS

DE 102018002610 A1 * 10/2019 ................ B60S 1/58
KR 20130005922 A * 1/2013 ................ B60S 1/46
KR 1020130005922 A 1/2013

*Primary Examiner* — Omair Chaudhri

(74) *Attorney, Agent, or Firm* — Vichit Chea; Carlson, Gaskey & Olds, P.C.

(57) ABSTRACT

Fluid spray nozzles are provided for use with motor vehicle assemblies. An exemplary fluid spray nozzle device may include features for directing cleaning fluid in a first direction toward a first surface and features for directing cleaning fluid in a second direction toward a second surface. The fluid spray nozzle simultaneously cleans the first surface and the second surface.

19 Claims, 10 Drawing Sheets

(56) References Cited

U.S. PATENT DOCUMENTS

2013/0185888 A1* 7/2013 Kargilis .................. B60S 1/583
15/250.31
2013/0319486 A1* 12/2013 Kikuta ...................... B60S 1/50
134/123
2019/0054855 A1* 2/2019 Krishnan ............. B60Q 1/2661
2019/0337490 A1 11/2019 Kawamura et al.
2020/0108877 A1* 4/2020 Prabhakar ............ B60Q 1/0035
2020/0198592 A1* 6/2020 Kondo ..................... B60Q 1/38
2021/0201054 A1* 7/2021 Toth ....................... G06V 20/58
2021/0394204 A1 12/2021 Sakai et al.
2022/0089102 A1* 3/2022 Sauer ..................... H04N 23/52

* cited by examiner 72
22
26
30
32
18
14
10

$S_{A1}$
98
90
$L_1$
86

$L_2$
94
30
$L_A$
102
$S_{A2}$ 3110
3090
3154
3154
3110
3094

DUAL OUTLET FLUID SPRAY NOZZLES FOR MOTOR VEHICLES

TECHNICAL FIELD

This disclosure relates generally to motor vehicles, and more particularly to fluid spray nozzles for cleaning one or more surfaces of the vehicle.

BACKGROUND

Some vehicles include an exterior camera disposed near a window of the vehicle. The view provided by camera and the window may become obscured due to the accumulation of debris, such as dirt, moisture, etc.

SUMMARY

In some aspects, the techniques described herein relate to a vehicle assembly, including: a closure member; a lamp assembly mounted to the closure member and including a light source and a camera; and a fluid spray nozzle mounted to the lamp assembly and including a first outlet configured to direct a fluid toward the closure member and a second outlet configured to direct the fluid toward the camera.

In some aspects, the techniques described herein relate to a vehicle assembly, wherein the closure member is a swing gate.

In some aspects, the techniques described herein relate to a vehicle assembly, wherein the lamp assembly is a center high-mounted stop lamp assembly.

In some aspects, the techniques described herein relate to a vehicle assembly, wherein the first outlet includes a first opening disposed along a first spray axis, and the first spray axis is aligned with a longitudinal axis of the fluid spray nozzle.

In some aspects, the techniques described herein relate to a vehicle assembly, wherein the first opening is configured to direct the fluid toward a window of the closure member.

In some aspects, the techniques described herein relate to a vehicle assembly, wherein the second outlet includes a second opening disposed along a second spray axis, the second spray axis is substantially perpendicular to the longitudinal axis of the fluid spray nozzle.

In some aspects, the techniques described herein relate to a vehicle assembly, wherein the camera is disposed adjacent to the light source.

In some aspects, the techniques described herein relate to a vehicle assembly, wherein the lamp assembly further includes a support configured to interface with the closure member and a bracket of the lamp assembly.

In some aspects, the techniques described herein relate to a vehicle assembly, wherein the bracket includes a housing configured to receive the light source and the camera.

In some aspects, the techniques described herein relate to a vehicle assembly, wherein the fluid spray nozzle is mounted to the housing.

In some aspects, the techniques described herein relate to a vehicle assembly, including a spare tire received in abutting contact with the support.

In some aspects, the techniques described herein relate to a vehicle assembly, including: a fluid tank including a cleaning fluid; a lamp assembly including a fluid spray nozzle, the fluid spray nozzle including an inlet configured to receive the cleaning fluid, a first outlet configured to direct the cleaning fluid in a first direction, and a second outlet configured to direct the cleaning fluid in a second direction; and a hose disposed between the fluid tank and the fluid spray nozzle, the hose configured to establish a flow path between the fluid tank and the inlet of the fluid spray nozzle.

In some aspects, the techniques described herein relate to a vehicle assembly, wherein the lamp assembly is mounted on a closure member.

In some aspects, the techniques described herein relate to a vehicle assembly, wherein the closure member is a swing gate.

In some aspects, the techniques described herein relate to a vehicle assembly, wherein the hose extends through a hinge and an interior cavity of the closure member.

In some aspects, the techniques described herein relate to a vehicle assembly, wherein the hose extends from the interior cavity, through an opening formed in an exterior of the closure member, and then along the lamp assembly.

In some aspects, the techniques described herein relate to a vehicle assembly, wherein the lamp assembly further includes a support configured to interface with a closure member and a bracket of the lamp assembly.

In some aspects, the techniques described herein relate to a vehicle assembly, wherein the bracket includes a housing configured to receive a light source and a camera.

In some aspects, the techniques described herein relate to a vehicle assembly, wherein the fluid spray nozzle is disposed on the housing.

In some aspects, the techniques described herein relate to a vehicle assembly, wherein the inlet is supported within an orifice of the housing.

DETAILED DESCRIPTION

This disclosure details fluid spray nozzles for motor vehicle assemblies. An exemplary fluid spray nozzle may include features for cleaning multiple surfaces. In some implementations, the nozzle may include a first outlet for directing cleaning fluid in a first direction toward a first surface and a second outlet for directing cleaning fluid in a second direction toward a second surface. These and other features are discussed in greater detail in the following paragraphs of this detailed description.

Figure 1:
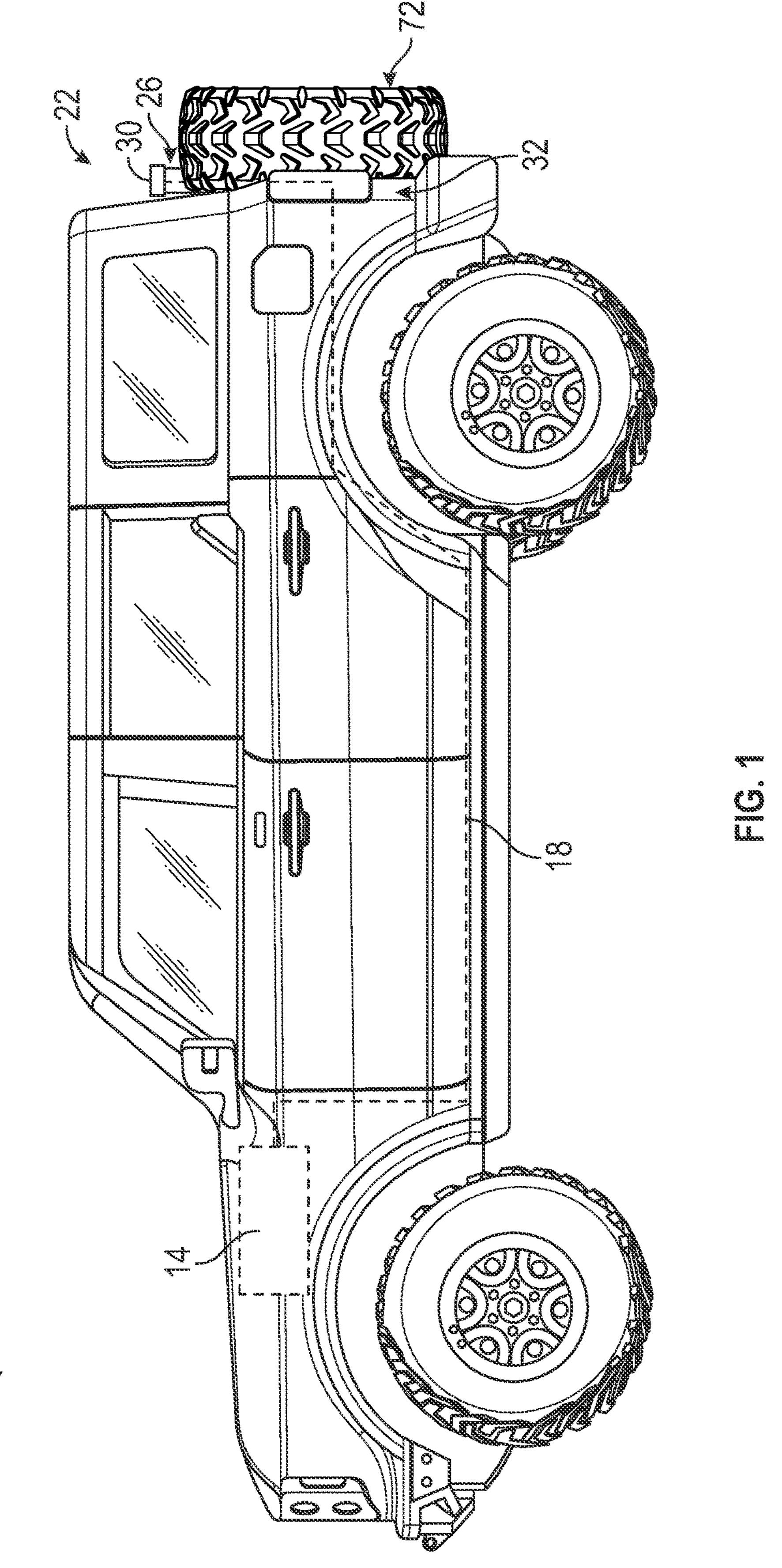
FIG. 1 schematically illustrates a vehicle.

FIG. 1 schematically illustrates a vehicle 10. The vehicle 10 may include a fluid tank 14, a hose 18, a closure member 22, a lamp assembly 26, and a fluid spray nozzle 30. As further discussed below, the fluid spray nozzle 30 may be configured to clean one or more surfaces of the vehicle 10. Together, the fluid tank 14, the hose 18, the closure member 22, the lamp assembly 26, and the fluid spray nozzle 30 establish a vehicle assembly of the vehicle 10.

In the illustrated embodiment, the vehicle 10 is depicted as a sports utility vehicle (SUV). However, the vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component or system.

The hose 18 may receive a cleaning fluid stored in the fluid tank 14 and supply the fluid to the fluid spray nozzle 30. The hose 18 supplies fluid across a vehicle body 32 in this example.

The closure member 22 may be moved between a closed position and an open position relative to the vehicle body 32. When moved to the open position, the closure member 22 permits users to access the vehicle interior. When closed, the closure member 22 provides a barrier between the interior and the exterior of the vehicle 10.

The closure member 22 is a swing gate of the vehicle 10, in this example. In other examples, the closure member 22 could be a tailgate, trunk, or any other type of vehicle closure member.

The lamp assembly 26 is mounted to the closure member 22, and the fluid spray nozzle 30 is mounted to the lamp assembly 26. The lamp assembly 26 is an exemplary center high-mounted stop lamp (CHMSL) assembly.

Figure 2:
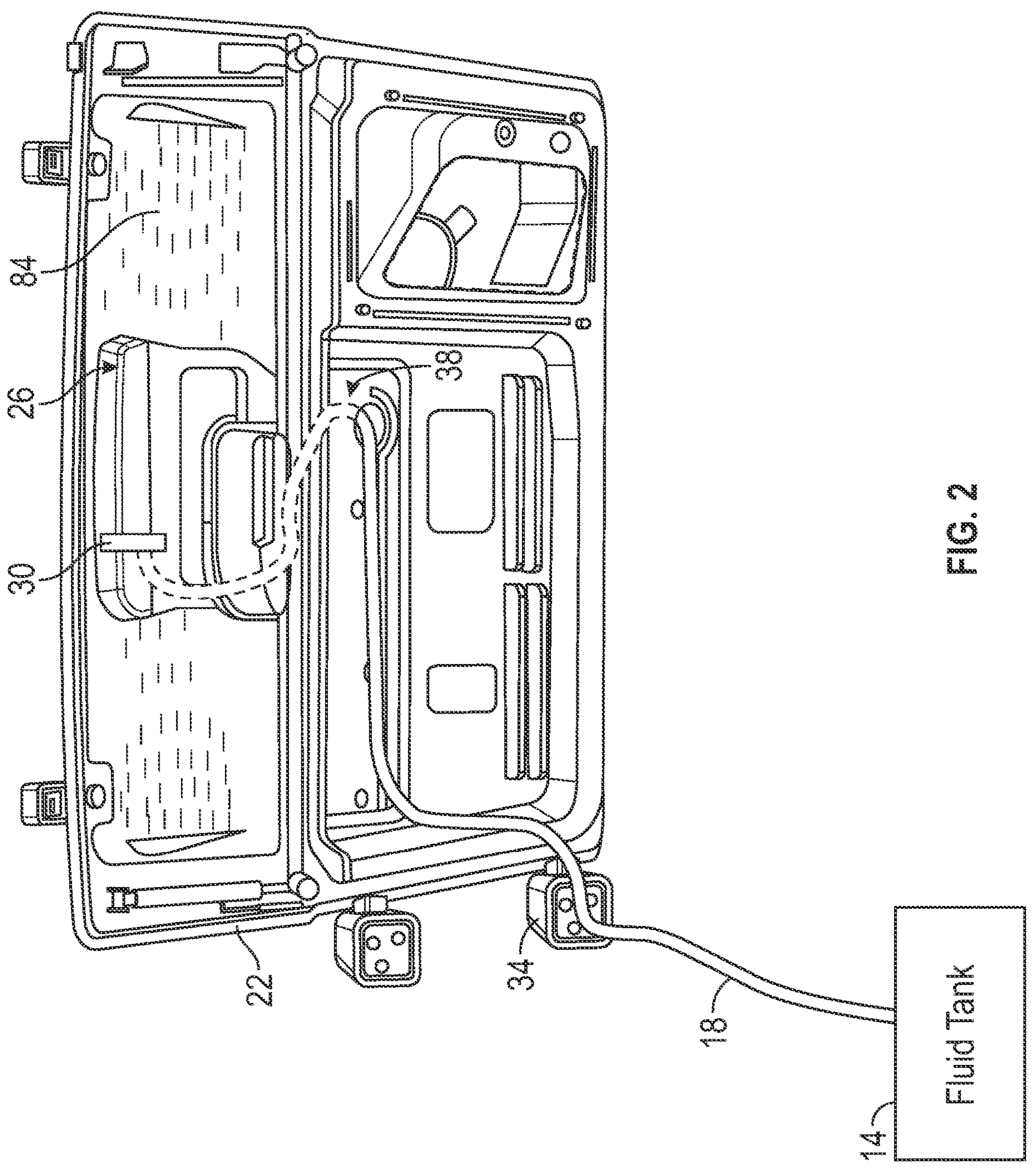
FIG. 2 illustrates select portions of the vehicle of FIG. 1.
Figure 3:
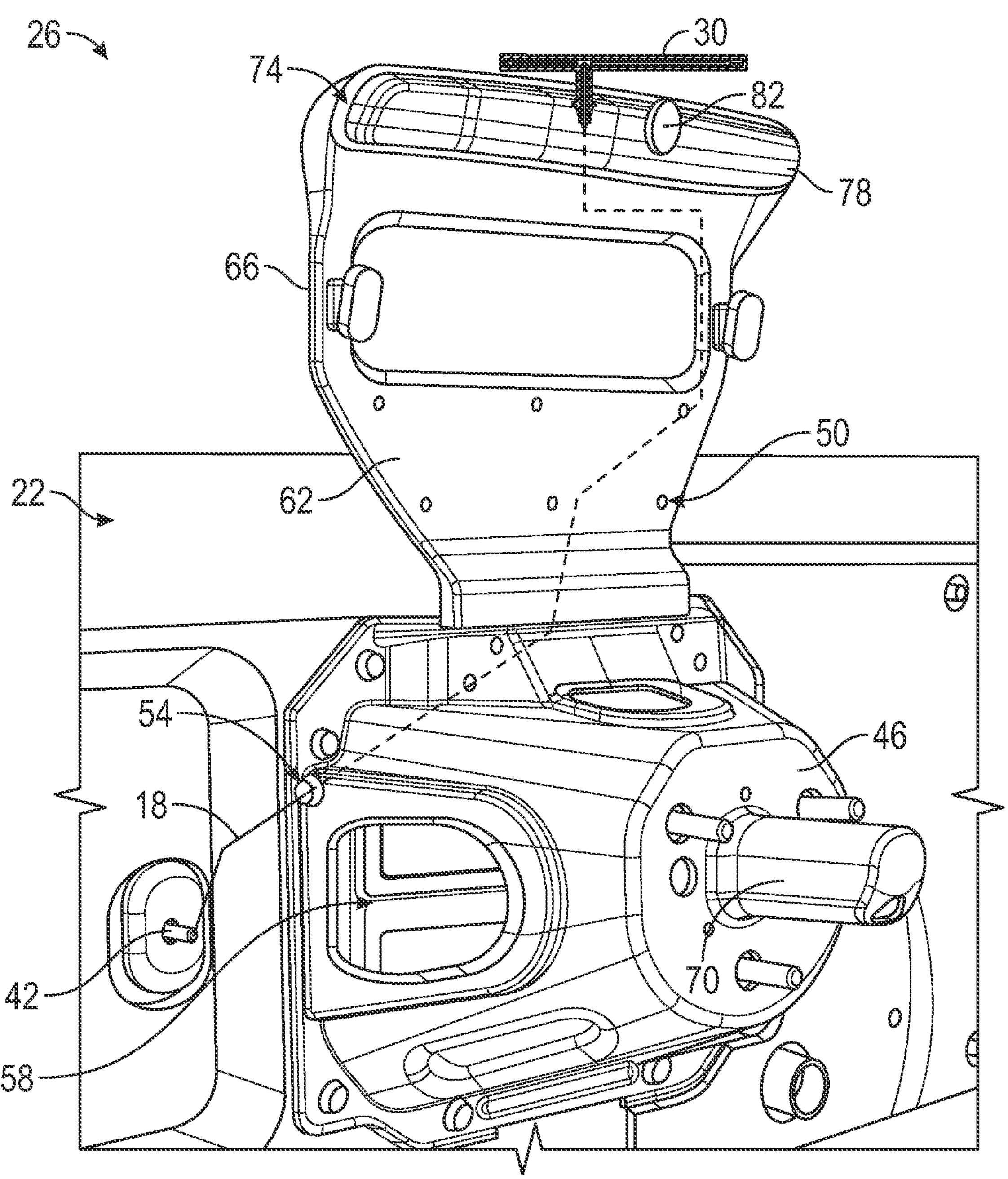
FIG. 3 illustrates an exemplary lamp assembly of the vehicle of FIGS. 1 and 2.

FIGS. 2 and 3 illustrate additional details associated with the vehicle assembly. The hose 18 may extend between the tank 14 and the fluid nozzle 30 to establish a flow path therebetween. The hose 18 may extend through portions of a hinge 34 that connects the closure member 22 to the vehicle body 32 and through an interior cavity 38 of the closure member 22. In addition, the hose 18 may extend from the interior cavity 38, through an opening 42 formed in an exterior of the closure member 22, and then along the lamp assembly 26.

The lamp assembly 26 may include a support 46 and a bracket 50 for mounting the lamp assembly 26 to the closure member 22. The hose 18 may extend through an opening 54 of the support 46 into an interior area 58 established between the closure member 22 and the support 46. The bracket 50 may include a first side 62 facing outboard away from the closure member 22 and a second side 66 facing inboard toward the closure member 22. The first and second sides 62/66 may be secured (e.g., bolted, welded, adhered, etc.) together to provide an interior area for receiving the hose 18. For instance, a portion of the overall length of the hose 18 may be sandwiched between the first and second sections 62/66.

A carrier 70 may extend from a sidewall of the support 46. The carrier 70 may accommodate a spare tire 72 (see FIG. 1) such that the spare tire is in abutting contact with the support 46.

The lamp assembly 26 may also include a housing 74 for accommodating a light source 78 and a camera 82. The light source 78 may be a brake light, for example. The camera 82 may be a rearview camera, for example. The camera 82 may be disposed adjacent to the light source 50 along an outer periphery of the housing 74. As will be appreciated, the camera 82 may be connected through one or more cables to corresponding displays, such as a digital rearview display, to allow a user to operate the display. The user may periodically observe that the image produced by the camera 82 has become obscured due to the buildup of debris, such as dirt, moisture, etc. The user may also observe that the view through a window 84 of the closure member 22 has become obscured due to the buildup of debris. The fluid stored in the tank 14 may be supplied to the fluid spray nozzle 30 through the hose 18 to simultaneously clean the camera 82 and the window 84 in response to a user prompt.

Figure 4:
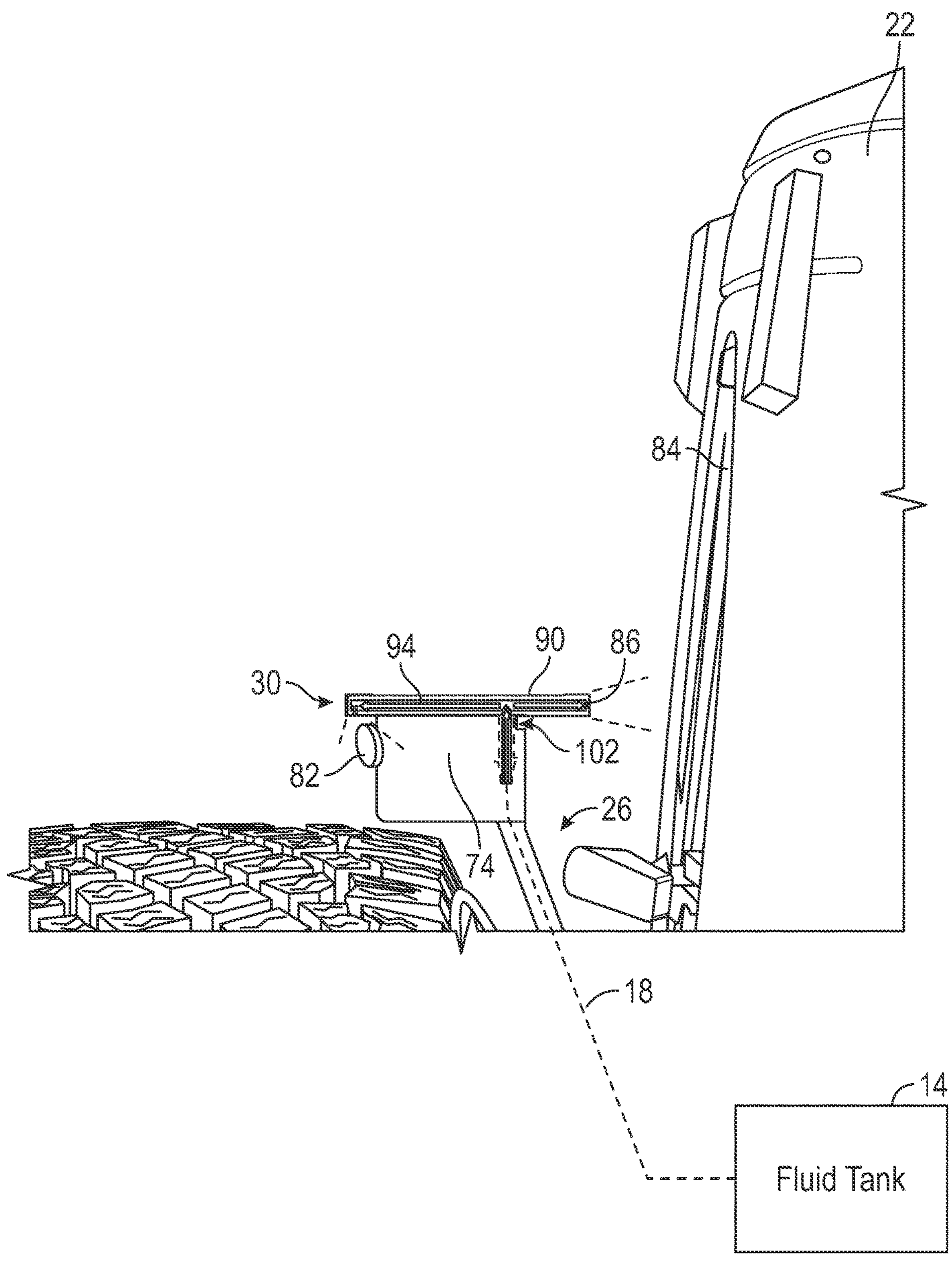
FIG. 4 is a partial side view of the vehicle of FIG. 1.
Figure 5:
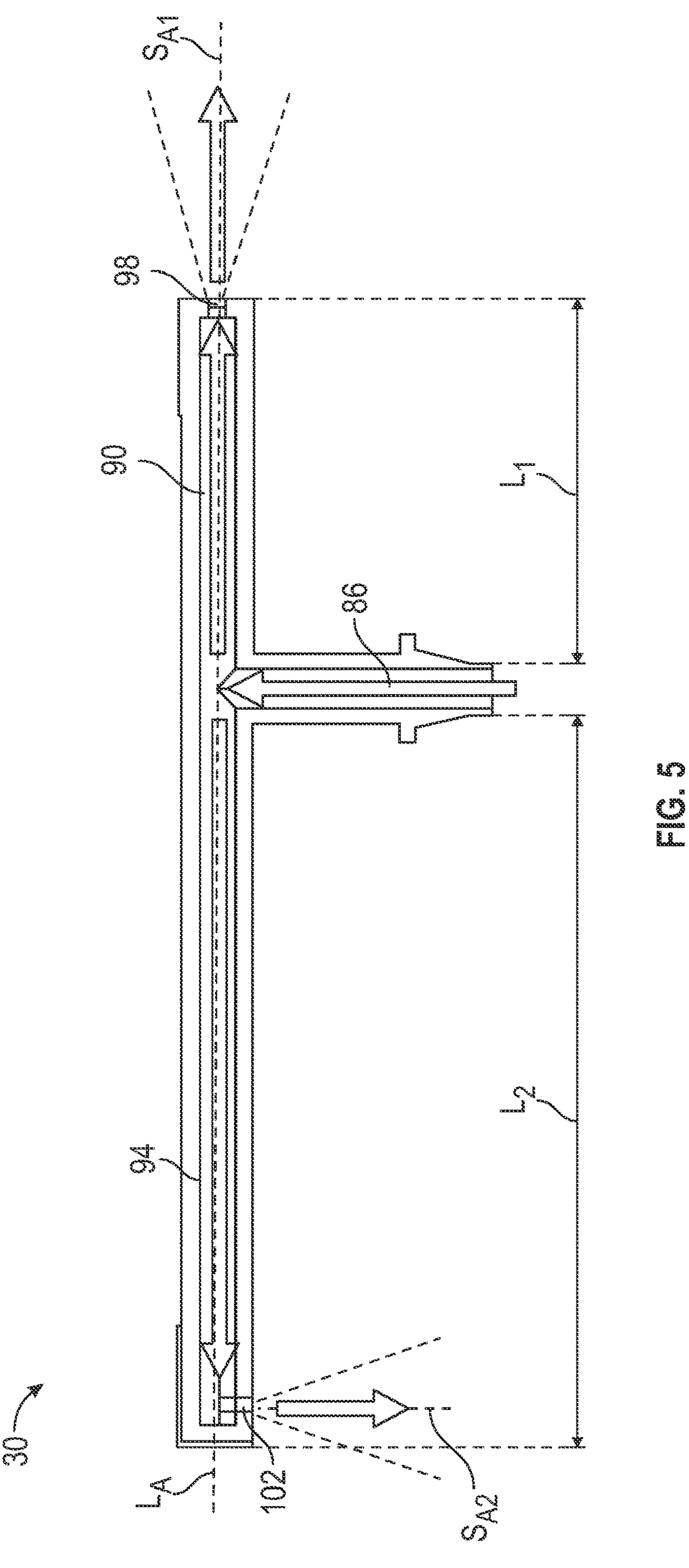
FIG. 5 illustrates an exemplary fluid spray nozzle.

FIGS. 4 and 5 further illustrate details associated with the lamp assembly 26 of the vehicle assembly discussed above. The fluid spray nozzle 30 may be mounted to the housing 74 of the lamp assembly 26. The fluid spray nozzle 30 may include an inlet 86, a first outlet 90, and a second outlet 94. The inlet 86 may receive the fluid through the hose 18 and distribute the fluid to the first outlet 90 and the second outlet 94. An end of the first outlet 90 may include a first opening 98 for spraying fluid in a first direction. The first opening 98 may be disposed along a first spray axis $S_{A1}$ that may be aligned with a longitudinal axis $L_A$ of the fluid spray nozzle 30, such that the first opening 98 may direct the fluid from the tank 14 toward the window 84 of the closure module 22. The first spray axis $S_{A1}$ is coaxial with the longitudinal axis $L_A$ in this example. Furthermore, an end of the second outlet 94 may include a second opening 102 for spraying fluid in a second direction that is different from the first direction. The second opening 102 may be disposed along a second spray axis $S_{A2}$ that may be substantially perpendicular to the longitudinal axis $L_A$ of the fluid spray nozzle 30, such that the second opening 102 may direct fluid from the tank 14 toward the camera 82. In the illustrated example, an angle between the second spray axis $S_{A2}$ and the longitudinal axis $L_A$ is about 90 degrees. However, other angles are possible within the scope of this disclosure. As shown in FIG. 4, the fluid spray nozzle 30 may simultaneously direct fluid toward both the camera 82 and the window 84 to remove debris.

Notably, as would be appreciated by a person of ordinary skill in the art having the benefit of this disclosure, removing debris from the camera 82 and the window 84 are illustrated as examples only, and the fluid spray nozzle 30 could be configured with any combination of the features above to clean any two surfaces of the vehicle 10.

The inlet 86 may be arranged such that the first outlet 90 has a first length $L_1$ and the second outlet 94 has a second length $L_2$. In one example, the second length $L_2$ is greater than the first length $L_1$.

In some examples, the inlet 86 may be supported within an orifice 104 of the housing 74 to fix the fluid spray nozzle 30 to the lamp assembly 26. The orifice 104 may be formed on an upper surface of the housing 74 and may provide a passage for receiving the inlet 86. When the inlet 86 is in the orifice 104, the fluid spray nozzle 30 may be fixedly mounted on the lamp assembly 26.

In this disclosure, like reference numerals designate like elements where appropriate and reference numerals with the addition of one-thousand or multiples thereof designate modified elements that are understood to incorporate the same features and benefits of the corresponding elements.

Figure 6A:
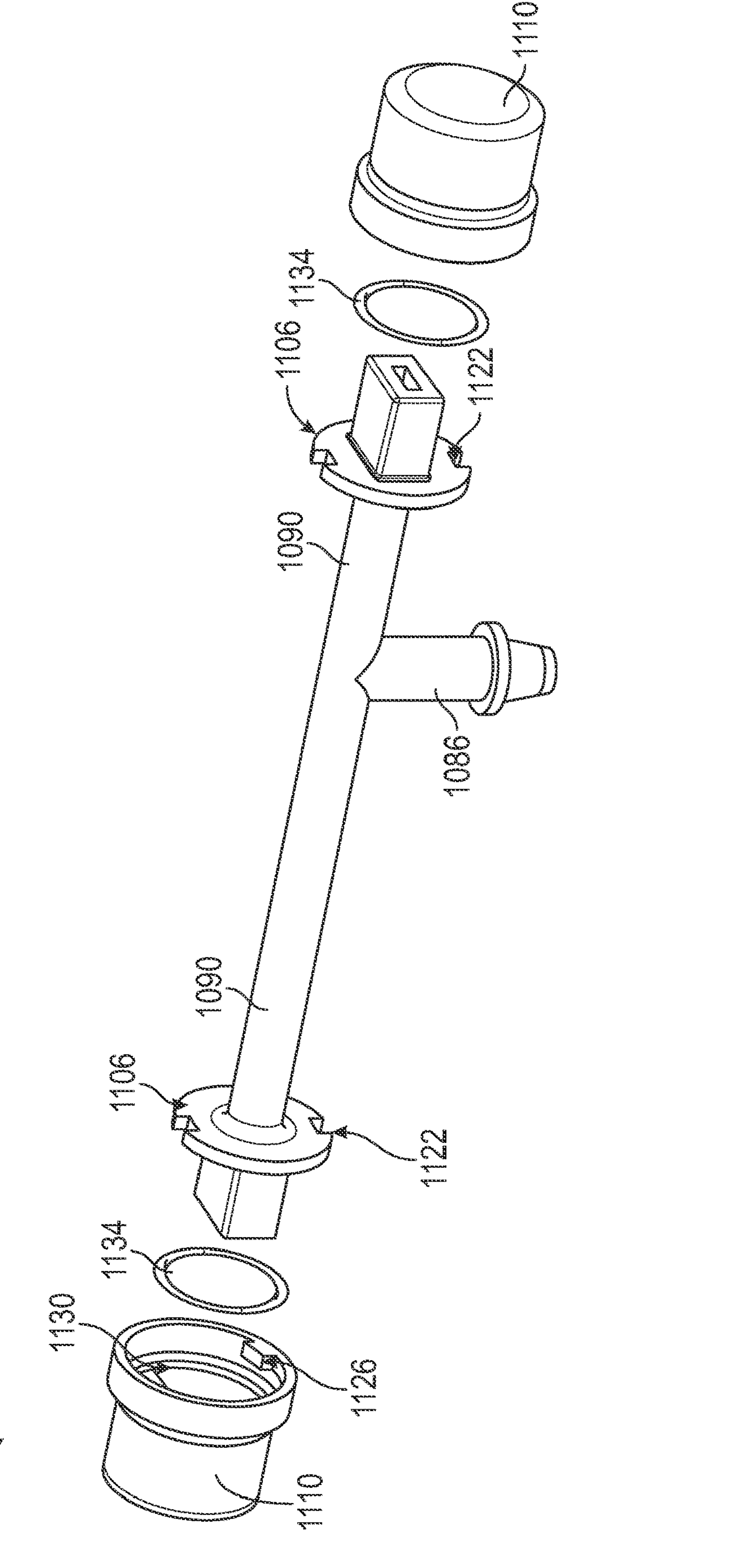
FIG. 6A illustrates an exploded view of another exemplary fluid spray nozzle.
Figure 6B:
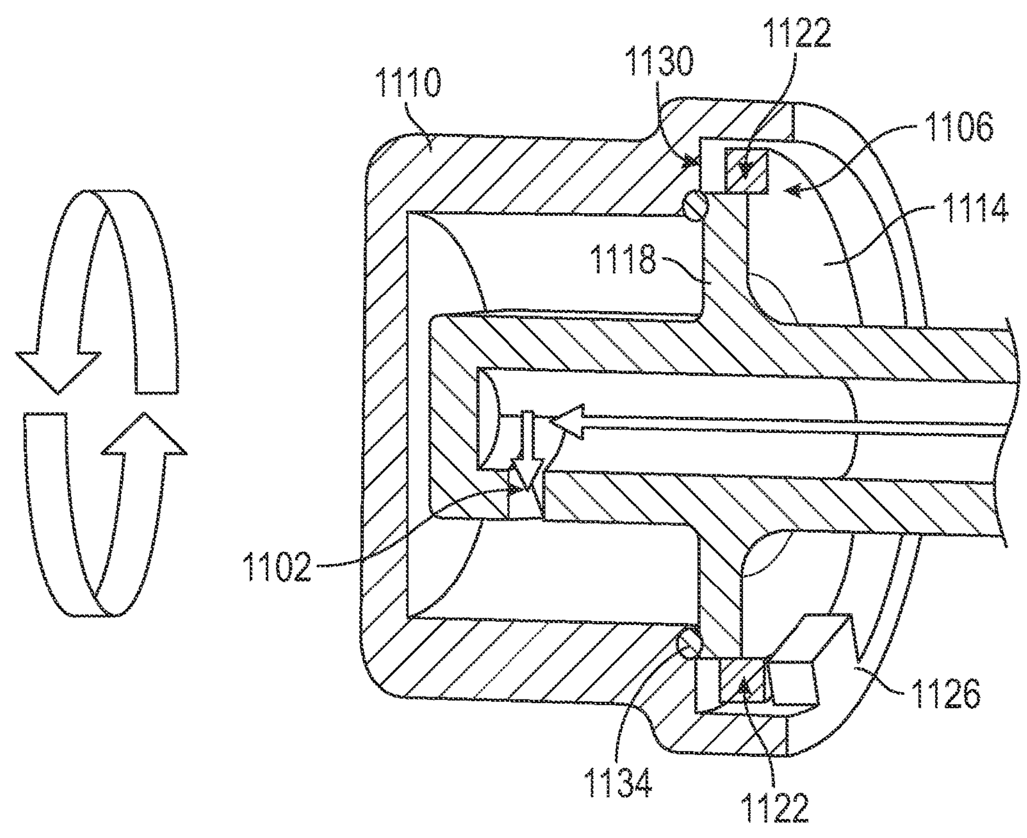
FIG. 6B is a cross-sectional view of an end of the fluid spray nozzle of FIG. 6A.

FIGS. 6A and 6B illustrate another exemplary fluid spray nozzle 1030. The fluid spray nozzle 1030 may include an inlet 1086, a first outlet 1090, and a second outlet 1094. Each of the first and second outlets 1090/1094 may include a rim 1106 for securing a respective cap 1110 to the fluid spray nozzle 1030. The rim 1106 may include a first side 1114 and a second side 1118. The rim 1106 may include one or more notches 1122 for receiving one or more corresponding tabs 1126 of the caps 1110. A retainer ring 1130 may extend circumferentially around an inner surface of each of the caps 1110. The tabs 1126 may enable the caps 1110 to rotatably transition between an uninstalled position (FIG. 6A) and an installed position (FIG. 6B). In the illustrated example, each of the caps 1110 may be installed on the fluid spray nozzle 1030 such that the tabs 1126 may be passed through the notches 1122 and then rotated about the rim 1106, and the tabs 1126 abut the first side 1114 of the rim 1106 and the retainer ring 1130 abuts the second side 1118 of the rim 1106. A seal 1134 may be disposed between the rim 1106 and the respective caps 1110 to seal the interface therebetween. The seal 1134 may be an o-ring or any other suitable seal.

As shown in FIG. 6B, when the cap 1110 is installed, fluid that is directed through an opening 1102 of the second outlet 1094 may be blocked from spraying an external surface, such as the camera 82 shown in FIGS. 3 and 4, for example. Therefore, the fluid spray nozzle 1030 may be configured to spray the fluid toward one or more surfaces of a vehicle by adding or removing the cap 1110 per the design requirement.

Figure 7A:
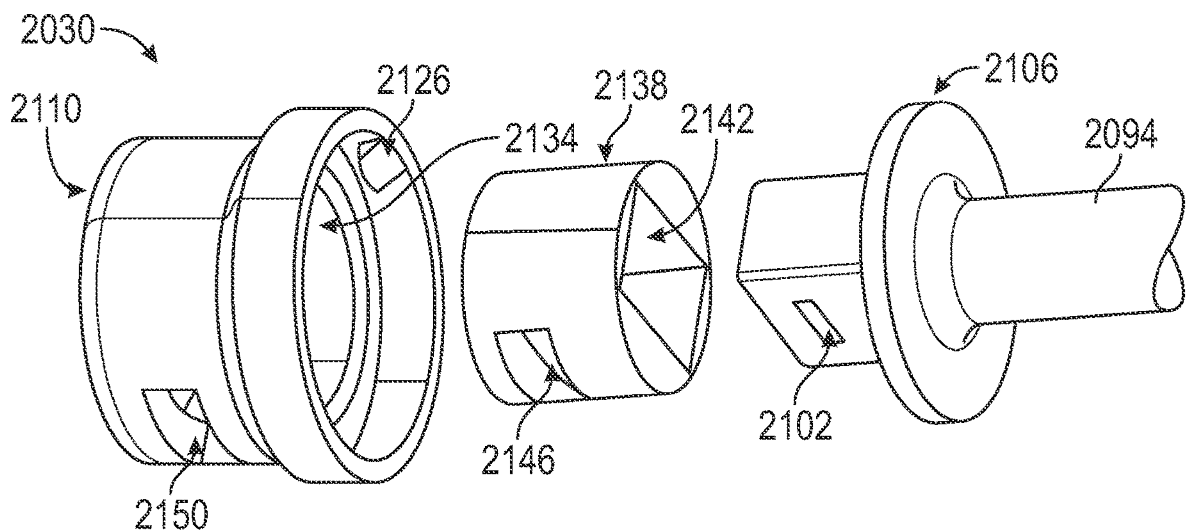
FIG. 7A illustrates an exploded view of yet another exemplary fluid spray nozzle.
Figure 7B:
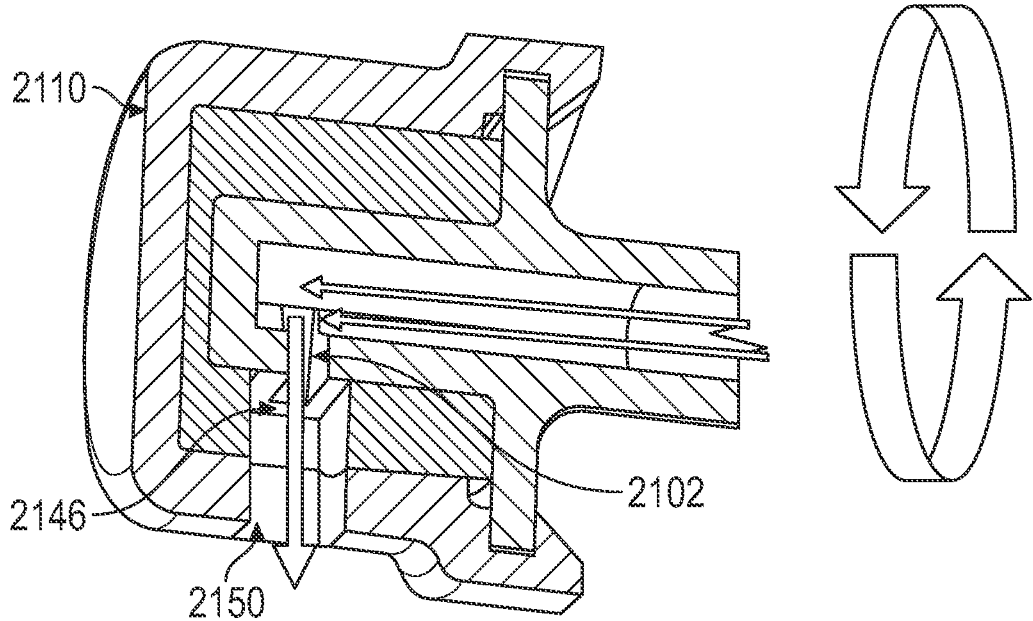
FIG. 7B is a cross-sectional view of the fluid spray nozzle of FIG. 7A in an open position.
Figure 7C:
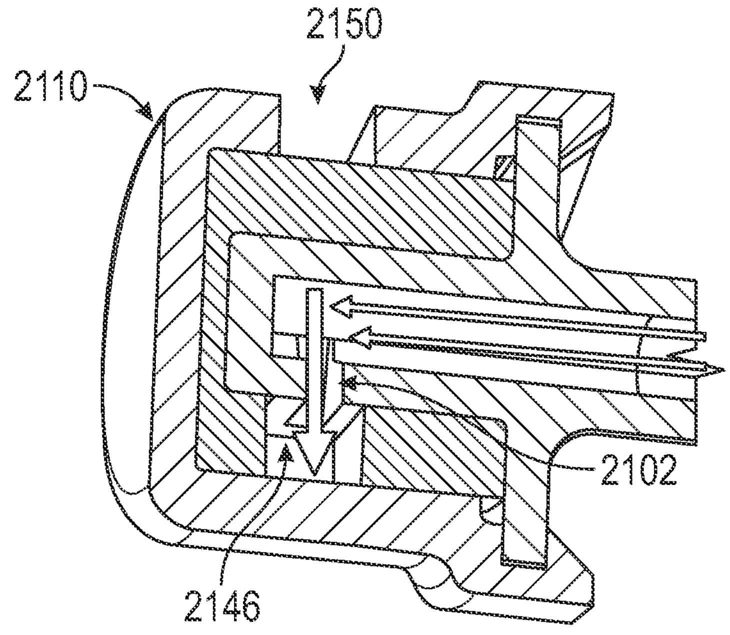
FIG. 7C is a cross-sectional view of the fluid spray nozzle of FIG. 7A in a closed position.

FIGS. 7A-7C illustrate select portions of another exemplary fluid spray nozzle 2030. An outlet 2094 of the fluid spray nozzle 2030 may include an opening 2102 for directing fluid, and a rim 2106 for securing a cap 2110 to the fluid spray nozzle 2030. The cap 2110 may include one or more tabs 2126 for installing the cap 2110 on the fluid spray nozzle 2030. In this example, the tabs 2126 are configured to snap onto the rim 2106 to establish locking engagement between the fluid spray nozzle 2030 and the cap 2110. The cap 2110 may also include a cavity 2134 for receiving a seal 2138. The seal 2138 may be a socket including a cavity 2142 for receiving an end of the outlet 2094 that includes the opening 2102. The cavity 2142 may include a sidewall defining an inner window 2146 for distributing fluid. A corresponding outer window 2150 may be provided along a sidewall of the cap 2110 to distribute fluid.

When installed on the fluid spray nozzle 2030, the cap 2110 may be rotated between an open position (FIG. 7B) and a closed position (FIG. 7C). As shown in FIG. 7B, the cap 2110 may rotated to the open position where the outer window 2150 is facing in the same direction of and is aligned with the opening 2102 and the inner window 2146 to permit fluid to be directed therethrough. The open position may permit fluid to be directed to an external surface, such as the camera 82 shown in FIGS. 3 and 4, for example. With reference now to FIG. 7C, the cap 2110 may be rotated to the closed position where the outer window 2150 is facing in a direction other than the direction of and is rotationally offset from the opening 2102 and the inner window 2146. While in the closed position, the cap 2110 may block fluid from spraying out of the opening 2102 toward the camera 82, for example.

Figure 8:
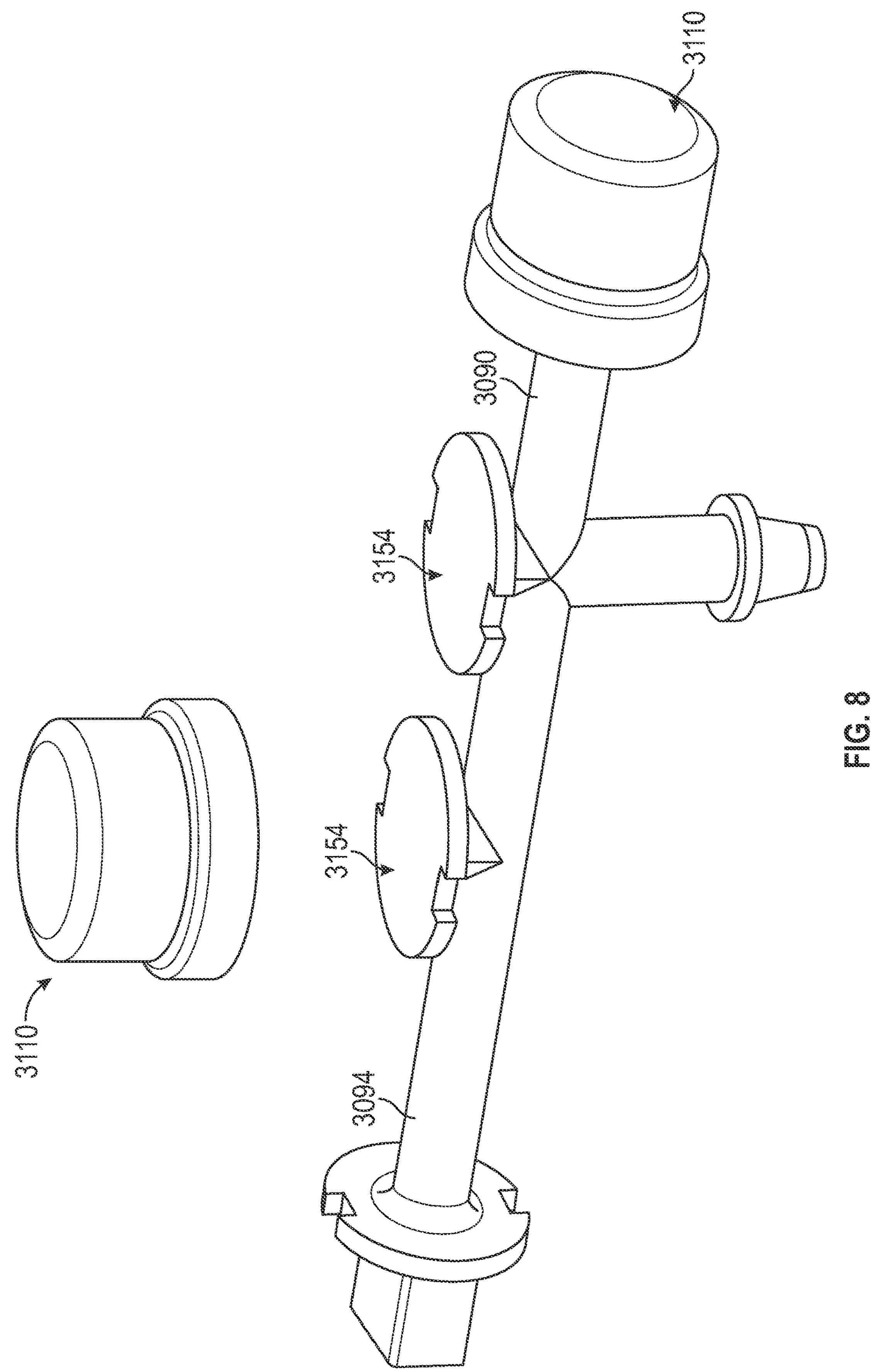
FIG. 8 illustrates yet another exemplary fluid spray nozzle.

FIG. 8 illustrates yet another exemplary fluid spray nozzle 3030. The fluid spray nozzle 3030 may include one or more mounts 3154 that are each configured to receive a respective cap 3110. A user may install one or both of the caps 3110 on the mounts 3154 when one or both of a first outlet 3090 and a second outlet 2094 is needed. In some examples where the user's vehicle is equipped with a rearview camera, such as the camera 82 shown in FIGS. 3 and 4, the user may install both of the respective caps 3110 on the mounts 3154 so that fluid may be sprayed toward the camera 82 and the window 84 (see FIG. 4). In other examples where the user's vehicle is not equipped with a rearview camera, such as the camera 82, the user may install one of the respective caps 3110 on the mounts 3154 so that fluid may be sprayed toward the window 84 only. Therefore, the fluid spray nozzle 3030 may be configured to store one or more caps 3110 per the configuration of the user's vehicle.

Figure 9:
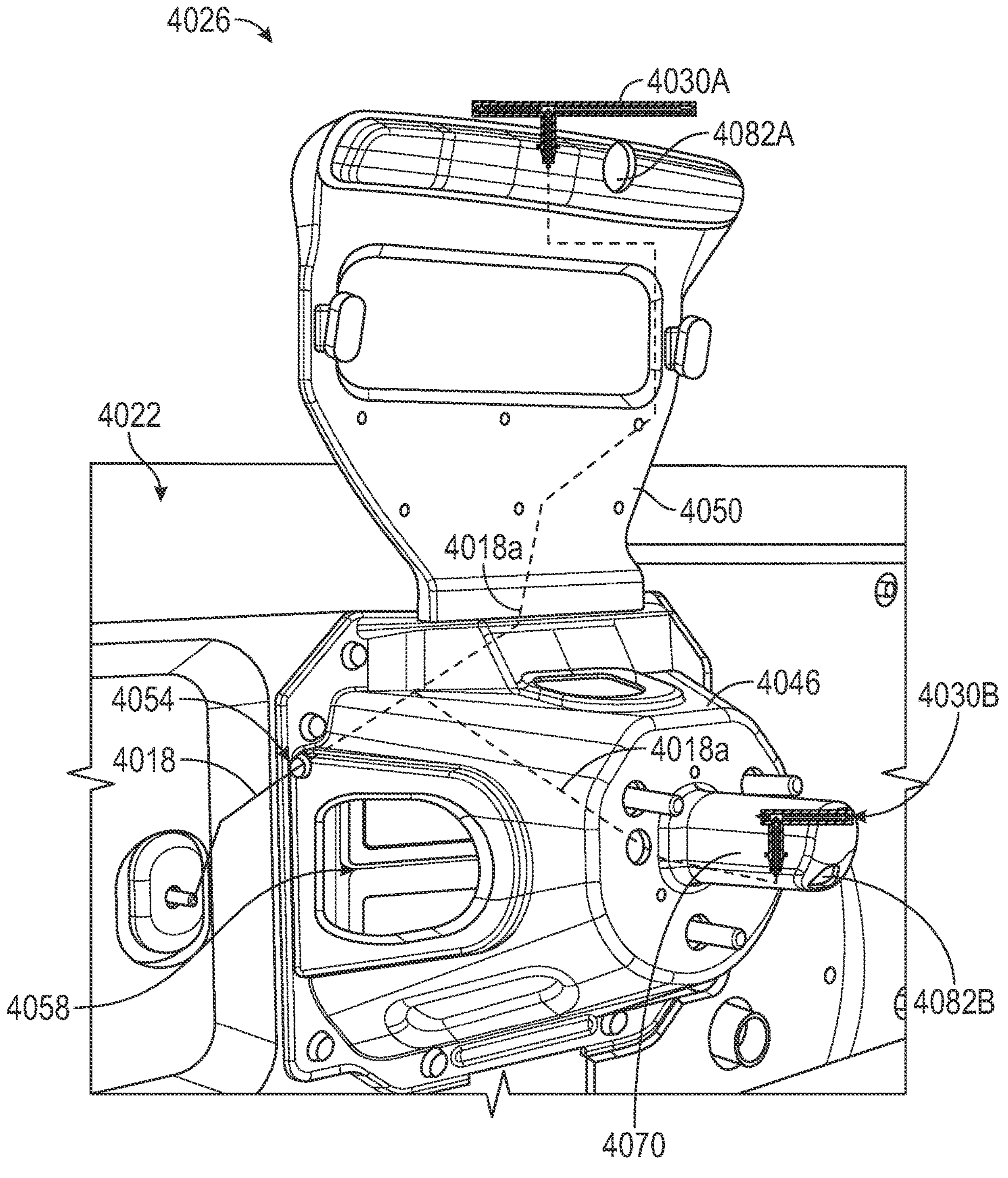
FIG. 9 illustrates another exemplary lamp assembly.

FIG. 9 illustrates another exemplary lamp assembly 4026. The lamp assembly 4026 may include a support 4046 and a bracket 4050 for mounting the lamp assembly 4026 to a closure member 4022. A hose 4018 may extend through an opening 4054 of the support 4046 into an interior area 4058 established between the closure member 4022 and the support 4046. Within the interior area 4058, the hose 4018 may divide into a first section 4018A that extends along the bracket 4050 and a second section 4018B that extends along a carrier 4070 of the support 4046.

The first section 4018A may connect to a first fluid spray nozzle 4030A. The first fluid spray nozzle 4030A may simultaneously direct fluid toward to a first camera 4082A and a window 4084 (not shown for illustrative purposes) simultaneously to remove debris.

The second section 4018B may connect to a second fluid spray nozzle 4030B. The second fluid spray nozzle 4030B may be configured to spray fluid toward a second camera 4082B disposed on an end of the carrier 4070. The second fluid spray nozzle 4030B may include an outlet with an opening for directing fluid toward the second camera 4082B. Thus, in the illustrated example, the hose 4018 permits fluid to be simultaneously distributed for cleaning the first camera 4082A, the second camera 4082B, and the window 4084.

The fluid spray nozzles of this disclosure are capable of simultaneously cleaning multiple surfaces. For example, the fluid spray nozzles may include features for directing cleaning fluid in a first direction toward a first surface and features for directing cleaning fluid in a second direction toward a second surface. The fluid spray nozzles may also include features for permitting and/or blocking cleaning fluid from spraying out of the fluid spray nozzles per design requirements.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle assembly, comprising:

a closure member;

a lamp assembly mounted to the closure member and including a light source and a camera; and a fluid spray nozzle mounted to the lamp assembly and including a first outlet configured to direct a fluid toward the closure member and a second outlet configured to direct the fluid toward the camera, wherein the lamp assembly includes a support configured to interface with the closure member, wherein the support is configured to accommodate a spare tire.

2. The vehicle assembly as recited in claim 1, wherein the closure member is a swing gate.

3. The vehicle assembly as recited in claim 1, wherein the lamp assembly is a center high-mounted stop lamp assembly.

4. The vehicle assembly as recited in claim 1, wherein the first outlet includes a first opening disposed along a first spray axis, and the first spray axis is aligned with a longitudinal axis of the fluid spray nozzle.

5. The vehicle assembly as recited in claim 4, wherein the first opening is configured to direct the fluid toward a window of the closure member.

6. The vehicle assembly as recited in claim 4, wherein the second outlet includes a second opening disposed along a second spray axis, the second spray axis is substantially perpendicular to the longitudinal axis of the fluid spray nozzle.

7. The vehicle assembly as recited in claim 1, wherein the camera is disposed adjacent to the light source.

8. The vehicle assembly as recited in claim 1, comprising a bracket of the lamp assembly.

9. The vehicle assembly as recited in claim 8, wherein the bracket includes a housing configured to receive the light source and the camera.

10. The vehicle assembly as recited in claim 9, wherein the fluid spray nozzle is mounted to the housing.

11. The vehicle assembly as recited in claim 1, comprising the spare tire received in abutting contact with the support.

12. The vehicle assembly as recited in claim 10, wherein the camera is disposed adjacent the light source along an outer periphery of the housing, and the second outlet extends outboard from an inlet of the fluid spray nozzle over the camera.

13. The vehicle assembly as recited in claim 10, wherein an orifice is formed on an upper surface of the housing and the inlet is supported within the orifice.

14. The vehicle assembly as recited in claim 1, comprising a bracket of the lamp assembly, the bracket including a housing configured to receive the light source and the camera, wherein the housing includes a first side facing inboard toward the closure member and an opposite second side facing outboard away from the closure member, and wherein the first outlet extends past the first side and the second outlet extends past the second side.

15. The vehicle assembly as recited in claim 14, wherein the light source and the camera are received on the second side.

16. The vehicle assembly as recited in claim 1, wherein the fluid spray nozzle includes an inlet configured to distribute fluid to the first outlet and the second outlet, the inlet arranged such that the first outlet has a first length and the second outlet has a second length, and the second length is greater than the first length.

17. The vehicle assembly as recited in claim 1, wherein the first outlet and the second outlet each include a rim configured to secure a respective cap to the fluid spray nozzle, each cap including an outer window and being rotatable between an open position and a closed position, wherein when in the open position, the cap permits fluid from the first and second outlets to be directed to an external surface, and when in the closed position, the cap blocks fluid from being directed to the external surface.

18. The vehicle assembly as recited in claim 1, comprising a bracket extending upwardly from the support, wherein the fluid spray nozzle is a first fluid spray nozzle that is mounted to a housing of the bracket, and a carrier extending from a sidewall of the support, wherein a second fluid spray nozzle is mounted to the carrier.

19. The vehicle assembly as recited in claim 18, wherein the camera is a first camera, and the housing of the bracket is configured to receive the light source and the first camera;

the carrier is configured to receive a second camera;

the second outlet of the first fluid spray nozzle is configured to direct fluid toward the first camera; and the second fluid spray nozzle includes an outlet configured to direct fluid toward the second camera.

* * * * *